(No Model.)
J. H. GREENLEAF.
Ferrule.
No. 229,603. Patented July 6, 1880.
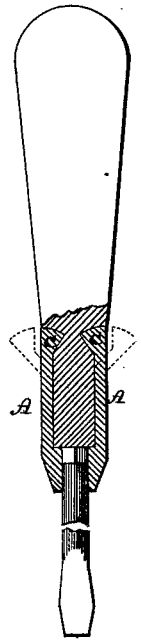
Witnesses=
W. W. Mortimer,
Will H. Kern.
Inventor=
Jos. H. Greenleaf.
per
F. A. Lehmann,
Atty.
N. PETERS, PHOTO-LITHOGRAPHER, WASHINGTON, D. C.

UNITED STATES PATENT OFFICE.

JOSEPH H. GREENLEAF, OF NEW HAVEN, CONNECTICUT.

FERRULE.

SPECIFICATION forming part of Letters Patent No. 229,603, dated July 6, 1880.

Application filed March 30, 1880. (No model.)

*To all whom it may concern:*

Be it known that I, JOSEPH H. GREENLEAF, of New Haven, in the county of New Haven and State of Connecticut, have invented certain new and useful Improvements in Fastening Ferrules to Handles; and I do hereby declare the following to be a full, clear, and exact description of the invention, such as will enable others skilled in the art to which it pertains to make and use it, reference being had to the accompanying drawings, which form part of this specification.

My invention relates to an improvement in fastening ferrules to handles; and it consists in forming flanges on the inside of the ferrules, which flanges fit in corresponding grooves in the sides of the handles, for the purpose of preventing the handles from turning around in the ferrules.
It further consists in forming ears or extensions on the upper edges of the ferrule, and which ears are widest at their upper ends, so as to fit in recesses made in the sides of the handle, and thus prevent the ferrule from becoming detached from the handle.

It still further consists in making a round hole partially through the lower end of the ferrule, and a smaller angular hole through the remaining portion of the end, and into which holes the upper end of the tool is driven, so as to prevent the necessity of forming a shank on this upper end to drive into the handle, all of which will be more fully described hereinafter.

The object of my invention is to furnish a ferrule which can be attached easily and securely to the handle without the slightest danger of its becoming detached, and preventing the danger of splitting the end of the handle by driving the shank of the tool into it.

Figure 1 is a vertical section of my invention. Fig. 2 is a side elevation of the same. Fig. 3 is an end view. Fig. 4 is an end view of the ferrule.

A represents the ferrule, which may be of any desired length, and which has a flange, B, formed upon two of its inner opposite sides, which flanges catch in grooves made in the two sides of the handle, and thus prevent the ferrule from turning around. Where these flanges are used, it makes no difference how loose the ferrule may become, it can never turn around on the end of the handle.

Projecting above the top edge of the ferrule from opposite sides are one or more ears, C, which are made widest at their upper ends, and which are intended to fit in recesses made in the side of the handle, so that the ferrule cannot become detached. These ears are bent backward, so as to allow the lower end of the handle to pass freely into the ferrule; but after the handle is once in place these ears are driven into the recesses made into the side of the handle, so as to come flush with the sides. Thus held, it will readily be seen that the handle cannot become detached until the ears are pried backward out of their sockets. By combining the flanges B with the ears C the handle is held so rigidly in place that it cannot possibly be turned in its ferrule, and hence no strain can be brought to bear upon the ears that would have a tendency to break them off or bend them.

This ferrule is cast in a single piece, and has its lower end made thick, as shown, and into this thick end is bored a round hole, which reaches near to the socket. From the end of this round hole there is made an angular hole of smaller diameter, which extends the balance of the way to the socket. A portion of the upper end of the tool is made round, so as to fit this round hole, and the extreme end of the upper portion is made angular, so as to fit the angular portion of the hole. The upper end of this tool is then driven into these two holes, where it is securely held without the necessity of forming a shank or prong upon it to drive into the wood, in the usual manner. The angular portion of the upper end of this tool fits in the angular part of the hole, and prevents any possibility of the tool ever turning around, no matter how great a twisting strain may be brought to bear upon it.

Where the shanks are formed on the tools for the purpose of driving them into the handle in the usual way, the handles are often split and made perfectly useless, and have to be thrown away. By means of this part of my improvement all need of shanks is done away with and the tool is much more securely and rigidly held.

Having thus described my invention, I claim—

A ferrule having ears or projections on its upper end to catch in the sides of the handle, substantially as described.

In testimony that I claim the foregoing I have hereunto set my hand this 25th day of March, 1880.

JOSEPH H. GREENLEAF.

Witnesses:
 B. B. PARKHURST,
 GEORGE E. GREENLEAF.